UNITED STATES PATENT OFFICE.

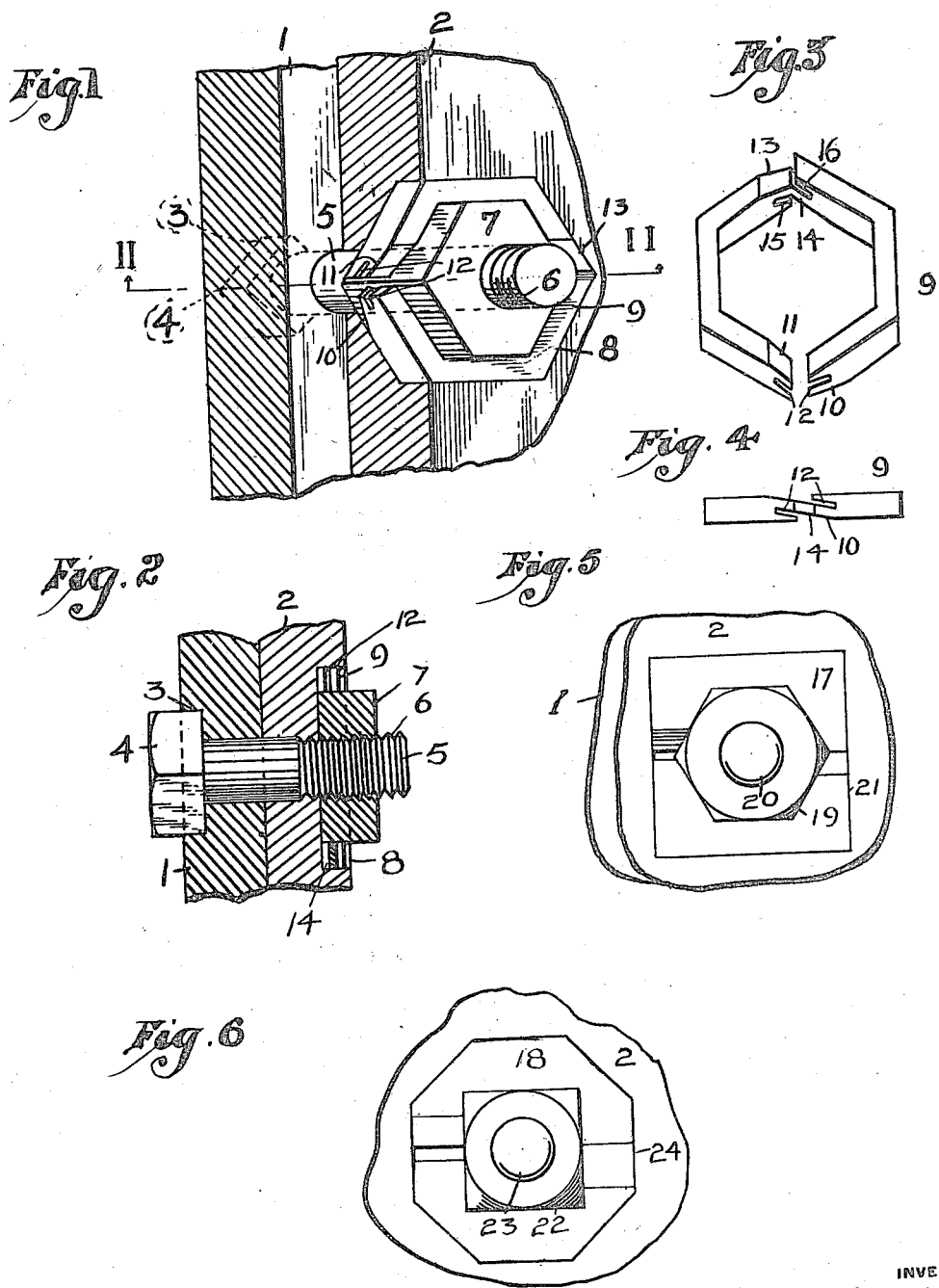

HARRY J. WATTS, OF TURTLE CREEK, PENNSYLVANIA.

NUT-LOCK.

1,256,085.   Specification of Letters Patent.   Patented Feb. 12, 1918.

Application filed March 3, 1917. Serial No. 152,215.

*To all whom it may concern:*

Be it known that I, HARRY J. WATTS, a subject of the King of England, residing at Turtle Creek, county of Allegheny, and State of Pennsylvania, have invented certain new and useful Improvements in Nut-Locks, of which the following is a specification.

This invention relates to nut locks and has for its object to provide a device of such class, in a manner as hereinafter set forth, with means to arrest off-turning of a nut element when mounted in clamping position under such conditions preventing any loosening of the elements which are secured together by the nut lock or an element maintained in position by the nut lock.

A further object of the invention is to provide a nut lock, in a manner as hereinafter set forth, with a nut locking member capable of being conveniently mounted in and removed from operative position when occasion requires.

Briefly described the invention resides in the provision of a polygonal recess or pocket in one of the elements adapted to be secured together, or in the element through which the bolt element of the lock extends, for the reception of a nut element of the lock and further for the reception of a frictional clamping nut locking member, having inner and outer polygonal shaped edges, which is interposed between the nut element and the walls of the pocket thereby preventing any loosening or off-turning of the nut element. The inner edge of the member conforms in contour to the shape of the nut and the outer edge to the shape of the pocket or recess.

Further objects of the invention are to provide a nut lock which is simple in its construction and arrangement, strong, durable, efficient and convenient in its use, readily set up and comparatively inexpensive to provide.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a nut lock in accordance with this invention showing the adaptation thereof in connection with the securing of a pair of elements together, the elements being shown in section.

Fig. 2 is a section on line II—II, Fig. 1.

Fig. 3 is a perspective view of the nut locking member.

Fig. 4 is an edge view thereof.

Figs. 5 and 6 are front views of modified forms.

Referring to Figs. 1 to 4, 1 and 2 denote a pair of plates, bars, rods, or other objects, termed elements and which are adapted to be secured together by a nut lock in accordance with this invention. The plate 1 may have a polygonal recess 3 for the reception of the head 4 of a bolt 5, extending through the elements 1 and 2, as well as projecting outwardly from said element 2. The bolt 5 has a threaded end portion 6.

Mounted upon the threaded portion 6 of the bolt 5, is a hexagonal nut 7, adapted to extend in a correspondingly shaped pocket or recess 8, formed in the element 2. The recess or pocket 8 may be of a depth whereby the nut 7 will project beyond the mouth thereof, or so that the nut can be completely housed within said recess or pocket.

Mounted in the recess or pocket 8 and interposed between the nut 7 and the walls of the said recess or pocket is a split end locking member 9, which corresponds in contour to the shape of the pocket or recess. The member 9 is resilient and when mounted in position frictionally engages with the nut and the walls of the pocket and under such conditions prevent any possibility of the nut turning.

To facilitate the removal of the member 9 the split ends are oppositely beveled as at 10, 11, and each end is also provided with a notch 12. By this arrangement a hook or other suitable tool can engage in the notch or under an end and the member 9 removed.

To facilitate the removal of the member 9, that portion opposite the split ends, is oppositely beveled as at 13, 14, and also provided with oppositely disposed notches 15, 16, to enable the removal of the member 9 when desired. By oppositely beveling the member 9, as at 13, 14, the body at such point is reduced in thickness, so if desired that portion of the member can be quickly severed by a tool and the sections removed.

The member 9 may be of any desired thickness, preferably of less thickness than the thickness of the nut, but if desired the member 9 may be of a thickness equal to the depth of the recess in which it is mounted.

The locking member as illustrated in Fig. 5, is indicated at 17 and is of a contour similar to that shown in Fig. 3, with the exception that the inner edge of the member 17 is hexagonal while its outer edge is square.

In the form shown in Fig. 6 the locking member, which is indicated at 18, is similar in contour to that shown in Fig. 3 with the exception that the inner edge of the member 18 is square and the outer edge octagonal.

In Fig. 5 the nut is indicated at 19, the bolt at 20, and the recess or pocket in the element 2 is indicated at 21. The recess 21 is square.

In Fig. 6 the nut is indicated at 22, the bolt at 23 and the recess or pocket in the element 2, at 24. The recess or pocket is octagonal in contour.

Providing a polygonal shaped recess or pocket in the member 2 and associating with the nut element, which is polygonal in contour, a polygonal shaped locking member which corresponds in contour to the shape of the nut and the shape of the recess, the nut will be prevented from off-turning and under such conditions the elements which are secured together by the lock will be prevented from becoming loose.

What I claim is:—

1. A nut lock comprising the combination with a bolt, and an element through which the bolt extends, said element having one face provided with a polygonal shaped pocket, of a polygonal shaped nut mounted on the bolt of said pocket, and a split polygonal shaped locking member interposed between the nut and the walls of said pocket to arrest turning movement of the nut.

2. A nut lock comprising the combination with a bolt, and an element through which the bolt extends, said element having one face provided with a polygonal shaped pocket, of a polygonal shaped nut mounted on the bolt at said pocket, and a resilient polygonal shaped locking member interposed between the nut and the walls of said pocket to arrest turning movement of the nut, and said member having means to permit of the removal thereof.

3. A nut lock comprising the combination with a bolt, and an element through which the bolt extends, said element having one face provided with a polygonal shaped pocket, of a polygonal nut mounted on the bolt at said pocket, and a polygonal shaped locking member interposed between the nut and the walls of said pocket to arrest turning movement of the nut, said member having beveled portions and notches to permit of the removal thereof from the recess.

4. In a nut lock a locking member comprising a body having inner and outer polygonal shaped edges, said body having one face provided with diametrically opposed beveled portions, and said body further having diametrically opposed notches, the entrance to said notches being above the lower part of said beveled portions.

In testimony whereof I affix my signature in the presence of two witnesses.

HARRY J. WATTS.

Witnesses:
ELLA J. LETZKUR,
MAX H. SROLOVITZ.

Copies of this patent may be obtained for five cents each, by addressing the "Commissioner of Patents, Washington, D. C."